United States Patent [19]
Takimoto et al.

[11] Patent Number: 6,025,706
[45] Date of Patent: Feb. 15, 2000

[54] METHOD FOR CONTROLLING THE OUTPUT VOLTAGE OF A DC-DC CONVERTER

[75] Inventors: Kyuichi Takimoto; Toshiyuki Matsuyama, both of Kasugai, Japan

[73] Assignee: Fujitsu Limited, Kawasaki, Japan

[21] Appl. No.: 09/271,240

[22] Filed: Mar. 17, 1999

[30] Foreign Application Priority Data

Aug. 21, 1998 [JP] Japan .................................. 10-235595

[51] Int. Cl.[7] .................................................. G05F 1/56
[52] U.S. Cl. ........................................................ 323/282
[58] Field of Search .................................... 323/282, 284, 323/285, 288, 234, 351

[56] References Cited

U.S. PATENT DOCUMENTS

| | | | |
|---|---|---|---|
| 5,572,112 | 11/1996 | Saeki et al. | 323/282 |
| 5,694,305 | 12/1997 | King et al. | 363/21 |
| 5,745,352 | 4/1998 | Sandri et al. | 363/41 |
| 5,781,100 | 7/1998 | Saeki et al. | 323/234 |
| 5,831,418 | 11/1998 | Kitagawa | 323/222 |

*Primary Examiner*—Adolf Deneke Berhane
*Attorney, Agent, or Firm*—Armstrong, Westerman, Hattori, McLeland & Naughton

[57] ABSTRACT

A DC—DC converter includes an offset comparator that compares an output voltage with a reference voltage in parallel with an error amplification circuit, which also compares the output voltage with the reference voltage. The offset comparator has a predetermined offset voltage set between its input terminals so that the offset comparator outputs a high signal when the voltage difference between its inputs exceeds the predetermined level. The output of the offset comparator is input, along with the error amplification circuit output, into a PWM comparator. The signal output by the offset voltage comparator allows the DC—DC converter to more quickly respond to a sudden increase in current consumption by a connected load. In responding to the increased current draw, the DC—DC converter quickly converges back at the reference voltage, such that the DC—DC converter provides a very stable output voltage.

29 Claims, 8 Drawing Sheets

METHOD FOR CONTROLLING THE OUTPUT VOLTAGE OF A DC-DC CONVERTER

BACKGROUND OF THE INVENTION

The present invention generally relates to a method and circuit for controlling the output voltage of a DC—DC converter, and, more particularly, to a method and circuit for controlling the output voltage of a DC—DC converter used to supply operating power to various semiconductor integrated circuit devices (ICs), such as central processing units (CPU) and memory devices (RAM and ROM).

FIG. 1 is a schematic circuit diagram of a conventional DC—DC converter 1. The DC—DC converter 1 includes a plurality of stand-alone elements and a control circuit 2 formed on a single chip semiconductor integrated circuit device. An output transistor 3, which is preferably an enhancement type N-channel MOS transistor, has a gate for receiving an output signal SG1 of the control circuit 2, a drain for receiving a DC power supply voltage Vin, and a source connected to an output terminal 5 via an output coil 4. The output terminal 5 is connected to a semiconductor integrated circuit device (not illustrated) as a load, and an output voltage Vout is output from therefrom. The output terminal 5 is connected to ground GND via a smoothing capacitor 7. The smoothing capacitor 7 and the output coil 4 form a smoothing circuit for smoothing the output voltage Vout. The output terminal 5 is further connected to the input terminal of the control circuit 2 via a resistor 8. A flywheel diode 6, which is preferably a Schottky diode, has a cathode connected to the source of the output transistor 3 and an anode connected to the ground GND.

The control circuit 2 includes an error amplification circuit 11, a PWM (pulse width modulation) comparator 12, a triangular wave oscillation circuit 13, and an output circuit 14. The error amplification circuit 11 compares the output voltage Vout, supplied to its inverting input terminal, and a reference voltage Vref supplied to its non-inverting input terminal, amplifies the voltage difference of these voltages, and supplies an error output signal SG2 to the PWM comparator 12. A series circuit of a phase compensation capacitor 15 and a resistor 16 is connected between the output terminal the error amplification circuit 11 and its inverting input terminal. The series circuit prevents oscillation of the error output signal SG2.

The PWM comparator 12 compares the error output signal SG2, supplied to its non-inverting input terminal, and a triangular wave signal SG3 from the triangular wave oscillation circuit 13, supplied to the inverting input terminal, and supplies a duty control signal SG4 to the output circuit 14. The duty control signal SG4 is a pulse signal having an L level when the level of the triangular wave signal SG3 exceeds the level of the error output signal SG2 and having an H level when the level of the triangular wave signal SG3 is below the level of the error output signal SG2. The output circuit 14 receives the duty control signal SG4 from the PWM comparator 12 and supplies a duty control output signal SG1 to the gate of the output transistor 3. The output transistor 3 is turned on or off in accordance with the duty control output signal SG1, and the output voltage Vout having a predetermined voltage (reference voltage Vref) is output from the output terminal 5.

Specifically, when the current consumption of a load connected to the output terminal 5 increases, the output voltage Vout drops. Hereupon, the voltage difference between the output voltage Vout and the reference voltage Vref increases, and the level of the error output signal SG2 rises. Because of the rise of the error output signal SG2, the H level period of the duty control signal SG4 is prolonged (duty ratio increases). In other words, the period when the level of the triangular wave signal SG3 exceeds the level of the error output signal SG2 is shortened and the period when the level of the triangular signal SG3 goes below the level of the error output signal SG2 is prolonged. When the duty ratio increases, the output signal SG1 having a high duty ratio is supplied to the output transistor 3. As a result, the on time of the output transistor 3 is prolonged, and the voltage value of the output voltage Vout increases due to the DC power supply voltage Vin.

When the voltage difference between the output voltage Vout and the reference voltage Vref decreases in accordance with the rise of the output voltage Vout, the rising of the error output signal SG2 becomes slow. Hereupon, the H level period of the duty control signal SG4 is shortened (duty ratio decreases). In other words, the period when the level of the triangular wave signal SG3 exceeds the level of the error output signal SG2 is prolonged and the period when the level of the triangular wave signal SG3 goes below the level of the error output signal SG2 is shortened. When the duty ratio is reduced, the output signal SG1 having a low duty ratio is supplied to the output transistor 3. As a result, the on time of the output transistor 3 is shortened, and the rise of the voltage value of the output voltage Vout becomes slow. By repeating this operation, the output voltage Vout converges on the reference voltage Vref, and a stable output voltage Vout is obtained.

A certain amount of time is necessary until the output voltage Vout converges on the predetermined voltage (reference voltage Vref) after the fluctuation of output voltage Vout. Most of this time is occupied by the delay time generated by the phase compensation capacitor 15 connected between the input/output terminals of the error amplification circuit 11. Therefore, as shown in FIG. 2, the DC—DC converter 1 cannot respond quickly to a sudden increase of the current consumption of the load and the output voltage Vout has a large drop. The drop of the output voltage Vout affects the operation of the load (i.e., semiconductor integrated circuit device) connected to the output terminal 5.

It is an object of the present invention to provide a method and circuit for controlling a DC—DC converter to output a stable output voltage.

SUMMARY OF THE INVENTION

In one aspect of the present invention, a method is provided that controls the output voltage of a DC—DC converter. First, an error output signal indicating the voltage difference between the output voltage the DC—DC converter and a reference voltage is generated. Then, a comparison signal is generated by comparing the voltage difference and a predetermined offset voltage. The comparison signal having a predetermined level is generated when the voltage difference is equal to or greater than the predetermined offset voltage. A triangular wave signal is generated, and a duty control signal having a predetermined duty ratio is generated by comparing the triangular wave signal and one of the error output signal and the comparison signal. The duty control signal having the maximum duty ratio and the comparison signal having a predetermined level are generated substantially simultaneously. Then, the output voltage is generated by causing an output transistor to turn on or off in response to the duty control signal. The output transistor is turned on while the duty control signal having the maximum duty ratio is being supplied to the output transistor.

In another aspect of the present invention, a method is provided that controls the output voltage of a DC—DC converter. First, an error output signal indicating the voltage difference between the output voltage of the DC—DC converter and a reference voltage is generated. Then, a triangular wave signal generated, and a duty control signal having a predetermined duty ratio is generated by comparing the error output signal and the triangular wave signal. A comparison signal is generated by comparing the voltage difference between the output voltage and the reference voltage and a predetermined offset voltage. The comparison signal having a predetermined level is generated when the voltage difference is equal to or greater than the predetermined offset voltage. Then, the output voltage is generated by causing an output transistor to turn on or off in response to the duty control signal. The comparison signal is supplied to the output transistor instead of the duty control signal to cause the output transistor to be turned on.

In yet another aspect of the present invention, a control circuit is provided that controls the output voltage of a DC—DC converter by controlling a first output transistor of the DC—DC converter. The control circuit includes an error amplification circuit for comparing the output voltage of the DC—DC converter and a reference voltage and generating an error output signal indicating the voltage difference between the output voltage of the DC—DC converter and the reference voltage. An offset comparator compares a predetermined offset voltage and the error output signal and generates a comparison signal. The comparison signal has a predetermined level when the error output signal is equal to or greater than the predetermined offset voltage. A triangular wave oscillation circuit generates a triangular wave signal. A first PWM comparator compares the triangular wave signal and one of the error output signal and the comparison signal, generates a first duty control signal having a predetermined duty ratio and supplies the first duty control signal to the first output transistor. The first duty control signal has a maximum duty ratio which turns on the first output transistor when the comparison signal having the predetermined level is supplied from the offset comparator to the first PWM comparator.

In one aspect of the present invention, a control circuit that controls the output voltage of a DC—DC converter by controlling a first output transistor of the DC—DC converter. The control circuit includes an error amplification circuit for comparing the output voltage of the DC—DC converter and a reference voltage and generating the error output signal indicating the voltage difference between the output voltage of the DC—DC converter and the reference voltage. An offset comparator compares a predetermined offset voltage and the error output signal and generates a comparison signal. The comparison signal has a predetermined level when the error signal is equal to or greater than the predetermined offset voltage. A triangular wave oscillation circuit generates a triangular wave signal. A first PWM comparator compares the error output signal and the triangular wave signal and supplies a first duty control signal having a predetermined duty ratio. A selection circuit selects one of the comparison signal and the first duty control signal and supplies the selected signal to the first output transistor. The selection circuit supplies the comparison signal to the first output transistor to turn on the first output transistor when the comparison signal having the predetermined level is generated.

In another aspect of the present invention, a DC—DC converter, which generates an output voltage, include a smoothing circuit and a first output transistor for generating the output voltage. An error amplification circuit compares the output voltage and a reference voltage and generates an error output signal indicating the voltage difference between the output voltage and the reference voltage. An offset comparator compares a predetermined offset voltage and the error output signal and generates a comparison signal. The comparison signal has a predetermined level when the error output signal is equal to or greater than the predetermined offset voltage. A triangular wave oscillation circuit generates a triangular wave signal. A first PWM comparator compares the triangular wave signal and one of the error output signal and the comparison signal, generates a first duty control signal having a predetermined duty ratio and supplies the first duty control signal to the first output transistor. The first duty control signal has a maximum duty ratio which turns on the first output transistor when the comparison signal having the predetermined level is supplied from the offset comparator to the first PWM comparator.

In yet another aspect of the present invention, a DC—DC converter, which generates an output voltage, include a smoothing circuit and a first output transistor for generating the output voltage. An error amplification circuit compares the output voltage and a reference voltage and generates an error output signal indicating the voltage difference between the output voltage of the DC—DC converter and the reference voltage. An offset comparator compares a predetermined offset voltage and the error output signal and generates a comparison signal. The comparison signal has a predetermined level when the error signal is equal to or greater than the predetermined offset voltage. A triangular wave oscillation circuit generates a triangular wave signal. A first PWM comparator compares the error output signal and the triangular wave signal and supplies a first duty control signal having a predetermined duty ratio. A selection circuit selects one of the comparison signal and the first duty control signal and supplies the selected signal to the first output transistor. The selection circuit supplies the comparison signal to the first output transistor to turn on the first output transistor during the time when the comparison signal having the predetermined level is generated.

In one aspect of the present invention, a control circuit, which controls the output voltage of a DC—DC converter, includes an error amplification circuit having an inverting input terminal that receives the output voltage of the DC—DC converter and a noninverting input terminal that receives a reference voltage. The error amplification circuit compares the output voltage and the reference voltage and generates an error amplification signal. An offset comparator has an inverting input terminal that receives the output voltage of the DC—DC converter and a noninverting input terminal that receives the reference voltage. The offset comparator compares the output voltage and the reference voltage and generating a comparison signal. When the output voltage is less than the reference voltage by more than a predetermined offset voltage value, the comparison signal has a high value. A triangular wave oscillation circuit generates a triangle wave signal. A first PWM comparator has a first noninverting input terminal connected to the error amplification circuit and receiving the error output signal, a second noninverting input terminal connected to the offset comparator and receiving the comparison signal, an inverting input terminal connected to the triangular wave oscillation circuit and receiving the triangle wave signal, and an output terminal connected to an output transistor of the DC—DC converter. The first PWM comparator compares the triangle wave signal to the larger one of the error output signal and the comparison signal and generates a first duty control signal therefrom. The first duty control signal has a maximum duty ratio which turns on the output transistor when the comparison signal has the high value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
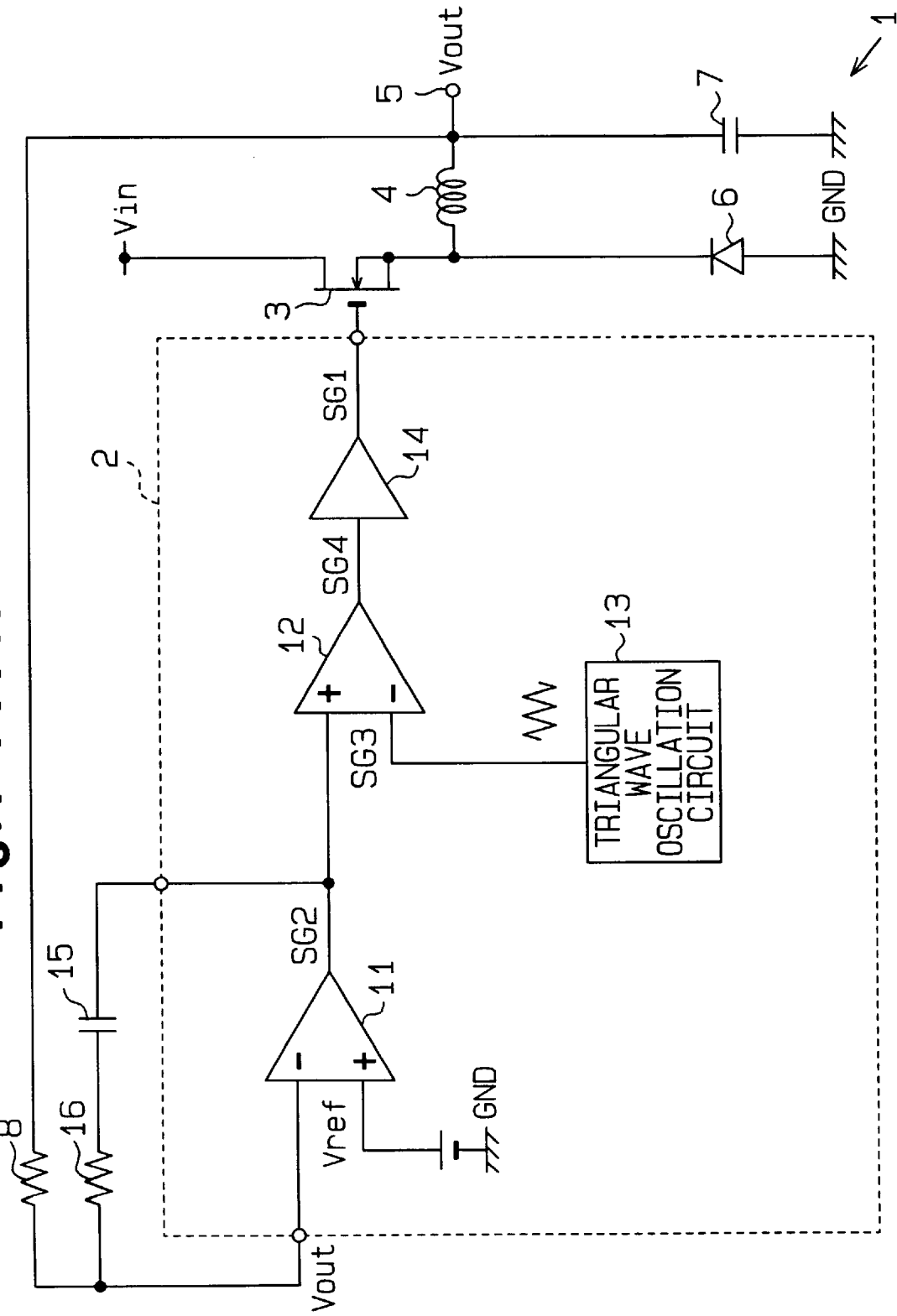
FIG. 1 is a schematic circuit diagram of a conventional DC—DC converter.
Figure 2:
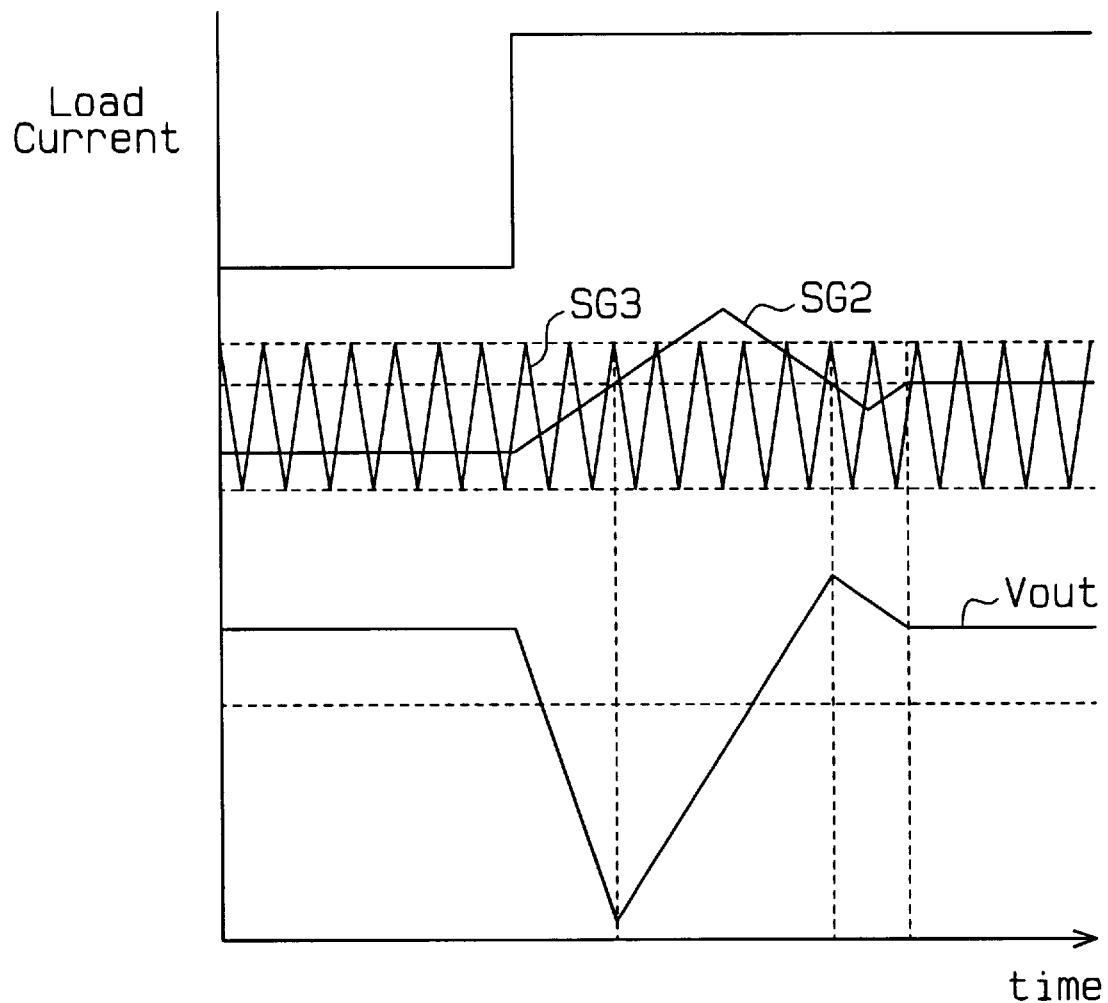
FIG. 2 is a waveform diagram explaining the operation of the DC—DC converter of FIG. 1.

In the drawings, like numerals are used for like elements throughout.

First Embodiment

Figure 3:
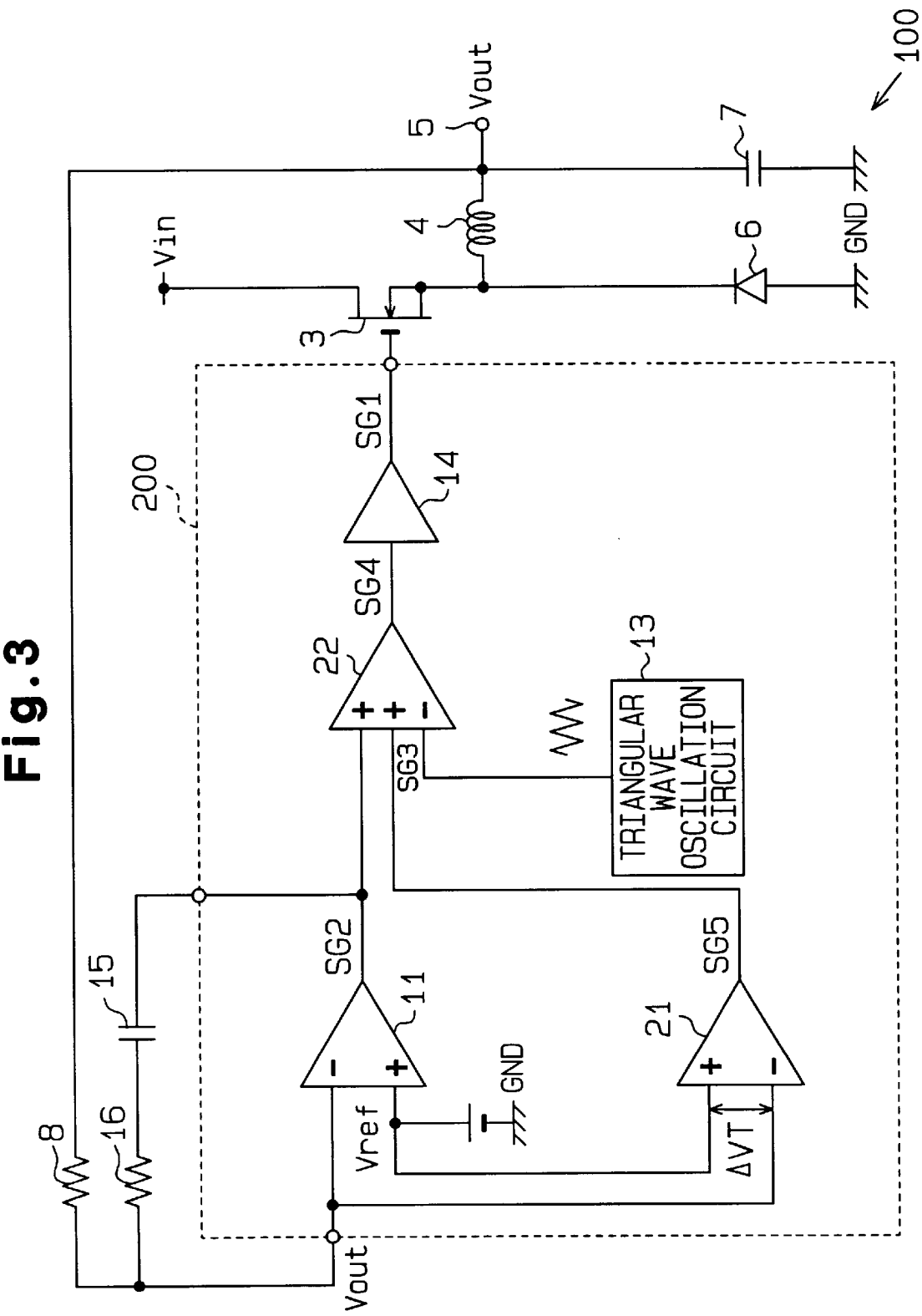
FIG. 3 is a schematic circuit diagram of a DC—DC converter according to a first embodiment of the present invention.

FIG. 3 is a schematic circuit diagram of a DC—DC converter 100 according to a first embodiment of the present invention. A control circuit 200 of the DC—DC converter 100 includes the error amplification circuit 11, the triangular wave oscillation circuit 13, a comparator 21 with an offset voltage, a PWM comparator 22, and the output circuit 14.

The comparator 21 is connected to the input terminal of the control circuit 200 and in parallel with the error amplification circuit 11. The comparator 21 has an inverting input terminal for receiving the output voltage Vout and a non-inverting input terminal for receiving the reference voltage Vref. The comparator 21 has an offset voltage $\Delta VT$ which is preset between the input terminals. When the voltage difference between the output voltage Vout and the reference voltage Vref is less than the offset voltage $\Delta VT$, the comparator 21 outputs an output signal SG5 having the L level. When the voltage difference exceeds the offset voltage $\Delta VT$, the comparator 21 outputs the output signal SG5 having the H level. In other words, the comparator 21 outputs the output signal SG5 having the H level during the period when the output voltage Vout is lower than the reference voltage Vref by the offset voltage $\Delta VT$. The H level of the output signal SG5 is preferably set to be the same as the maximum level of the triangular wave signal SG3 or higher. The L level of the output signal SG5 is preferably set to be the same as the minimum level of the triangular wave signal SG3 or lower.

Figure 4A:
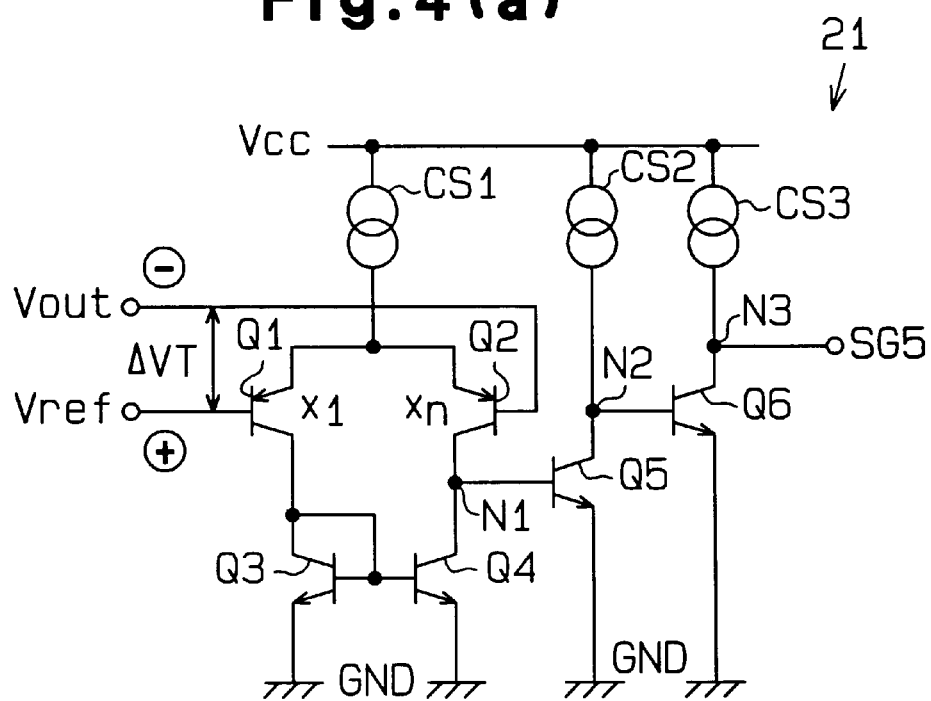
FIG. 4 (a) and FIG. 4 (b) are diagrams of comparator circuits of the DC—DC converter of FIG. 3.

FIG. 4(a) is a circuit diagram of the comparator 21 in a first example. The comparator 21 has two pnp type bipolar transistors Q1 and Q2, four npn type bipolar transistors Q3 to Q6, and three constant current sources CS1 to CS3. The transistors Q1 and Q2 form an input circuit of the comparator 21. The collectors of the transistors Q1 and Q2 are connected together, and to a high potential power supply Vcc via the constant current source CS1. The emitters of the transistors Q1 and Q2 are connected to the ground GND via the transistors Q3 and Q4. The base of the transistor Q1 is the non-inverting input terminal of the comparator 21 that receives the reference voltage Vref. The base of the transistor Q2 is the inverting input terminal of the comparator 21 that receives the output voltage Vout. The transistor Q2 has a size qual to the size of the transistor Q1 multiplied by "n". The offset voltage $\Delta VT$ between the input terminals of the comparator 21 is set by varying the sizes of the transistors Q1 and Q2.

The transistors Q3 and Q4 form a current mirror circuit and have their bases connected together and to the collector of the transistor Q3.

The transistors Q5 and Q6 form an output circuit of the comparator 21. The collector of the transistor Q5 is connected to the high potential power supply Vcc via the constant current source CS2, and the emitter of the transistor Q5 is connected to the ground GND. The base of the transistor Q5 is connected to a node N1 between the emitter of the transistor Q2 and the collector of the transistor Q4. The collector of the transistor Q6 is connected to the high potential power supply Vcc via the constant current source CS3, and the emitter of the transistor Q6 is connected to the ground GND. The base of the transistor Q6 is connected to a node N2 between the constant current source CS2 and the collector of the transistor Q5. A node N3 between the constant current source CS3 and the collector of the transistor Q6 is the output terminal of the comparator 21.

When the voltage difference between the output voltage Vout and the reference voltage Vref is less than the offset voltage $\Delta VT$, the value of the current of the transistor Q2 becomes smaller than that of the transistor Q1. Therefore, the potential at the node N1 drops, the value of the current of the transistor Q5 becomes small, and the potential at the node N2 rises. Accordingly, the transistor Q6 turns on, and the output signal SG5 having the L level is output from the node N3 (i.e., the output terminal of the comparator 21). When the voltage difference between the output voltage Vout and the reference voltage Vref exceeds the offset voltage $\Delta VT$, the value of the transistor Q2 current becomes larger than that of the transistor Q1. Therefore, the potential at the node N1 rises, the value of the transistor Q5 current becomes large, and the potential at the node N2 drops. Accordingly, the transistor Q6 turns off, and the output signal SG5 having the H level is output from the node N3 (the output terminal of the comparator 21).

Figure 4B:
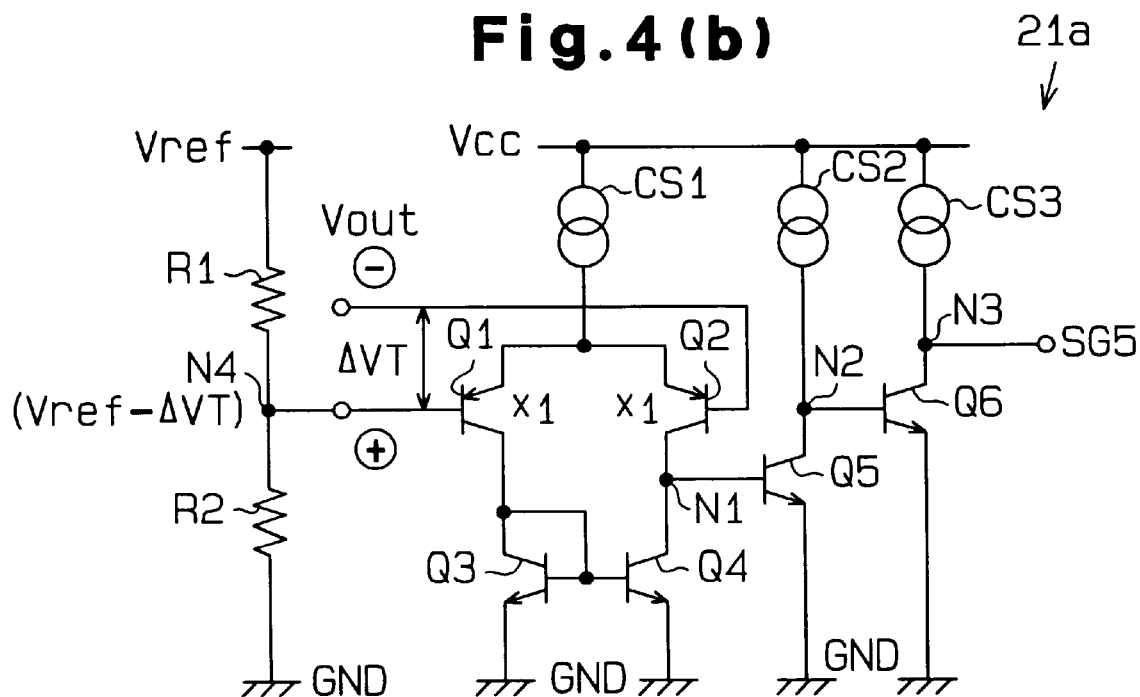

FIG. 4(b) is a circuit diagram of a comparator 21a which may be used in lieu of the comparator 21. The transistors Q1 and Q2 of the comparator 21 have the same size. The base of the transistor Q1 (non-inverting input terminal of the comparator 21) is connected to a node N4 between resistors R1 and R2. The resistors R1 and R2 form a resistance dividing circuit for resistance-dividing the reference voltage Vref to generate a lower potential (Vref−$\Delta VT$) than the reference voltage Vref by the offset voltage $\Delta VT$. In other words, the reference voltage Vref is divided in accordance with the resistances of the resistors R1 and R2, and the potential (Vref−ΔVT) is generated at the node N4. In this manner, the offset voltage is set between the inverting input terminal and the non-inverting input terminal of the comparator 21.

Returning to again FIG. 3, the PWM comparator 22 has a first non-inverting input terminal for receiving the error output signal SG2 from the error amplification circuit 11, a second non-inverting input terminal for receiving the output signal SG5 from the comparator 21, and an inverting terminal for receiving the triangular wave signal SG3 from the triangular wave oscillation circuit 13. The PWM comparator 22 compares the triangular wave signal SG3 and larger of the other two input signals and generates and supplies a duty control signal SG4 to the output circuit 14. The duty control signal SG4 is a pulse signal having the L level during the period when the level of the triangular wave signal SG3 is larger than the level of the one signal and having the H level during the period when the level of the triangular wave signal SG3 is smaller than the level of the one signal.

The H level of the output signal SG5 is set to the same as the maximum level of the triangular wave signal SG3 or a higher level than it. Accordingly, during the period when the output signal SG5 has the H level, the PWM comparator 22 compares the output signal SG5 and the triangular wave signal SG3 and outputs a duty control signal SG4 (duty ratio: 100%) having the H level. In other words, during the period when the output signal has the H level, the duty control signal SG4 having the maximum duty ratio is generated. Thus, when the output signal SG5 has the H level, the duty control signal SG4 has the high level, causing the output circuit 14 to output the output signal SG1 having the H level, which maintains the output transistor 3 in the on state.

The L level of the output signal SG5 is set to the minimum level of the triangular wave signal or lower. Accordingly, when the output signal SG5 has the L level, the PWM comparator 22 compares the error output signal SG2 and the triangular wave signal SG3 and outputs the duty control signal SG4 having a predetermined duty ratio. Accordingly, when the output signal SGS has the low level, the output transistor 3 is on/off-controlled in the same manner as the prior art.

Next, the operation of the DC—DC converter 100 will be described. When the change in the current consumption of the load is relatively small (i.e., the voltage difference between the output voltage Vout and the reference voltage Vref is less than the offset voltage ΔVT), the comparator 21 supplies the output signal SG5 having the L level to the PWM comparator 22. Accordingly, the PWM comparator 22 compares the error difference output signal SG2 and the triangular wave signal SG3 and supplies the duty control signal SG4 having a predetermined duty ratio to the output circuit 14. The output circuit 14 receives the duty control signal SG4 and supplies the duty control output signal SG1 to the output transistor 3. Thus, the output transistor 3 is on/off-controlled in accordance with the duty control output signal SG1 so that the output voltage Vout output from the output terminal 5 converges on the predetermined voltage (reference voltage Vref).

When the current consumption of the load suddenly changes (i.e., when the output voltage Vout is equal to or less than the value of the reference voltage Vref minus the offset voltage ΔVT), the comparator 21 supplies the output signal SG5 having the H level to the PWM comparator 22. The PWM comparator 22 supplies the duty control signal SG4 having the H level during the period when the output signal SG5 is the H level. The output circuit 14 receives the duty control signal SG4 and supplies an output signal SG1 having the H level to the output transistor 3. Thus, the output transistor 3 is maintained in the on state in accordance with the output signal SG1 having the H level. Accordingly, the dropped output voltage Vout rises quickly by the supply of the DC power supply voltage Vin. When the output voltage Vout becomes higher than the voltage (Vref−ΔVT), the comparator 21 supplies the output signal SG5 having the L level to the PWM comparator 22.

Figure 5:
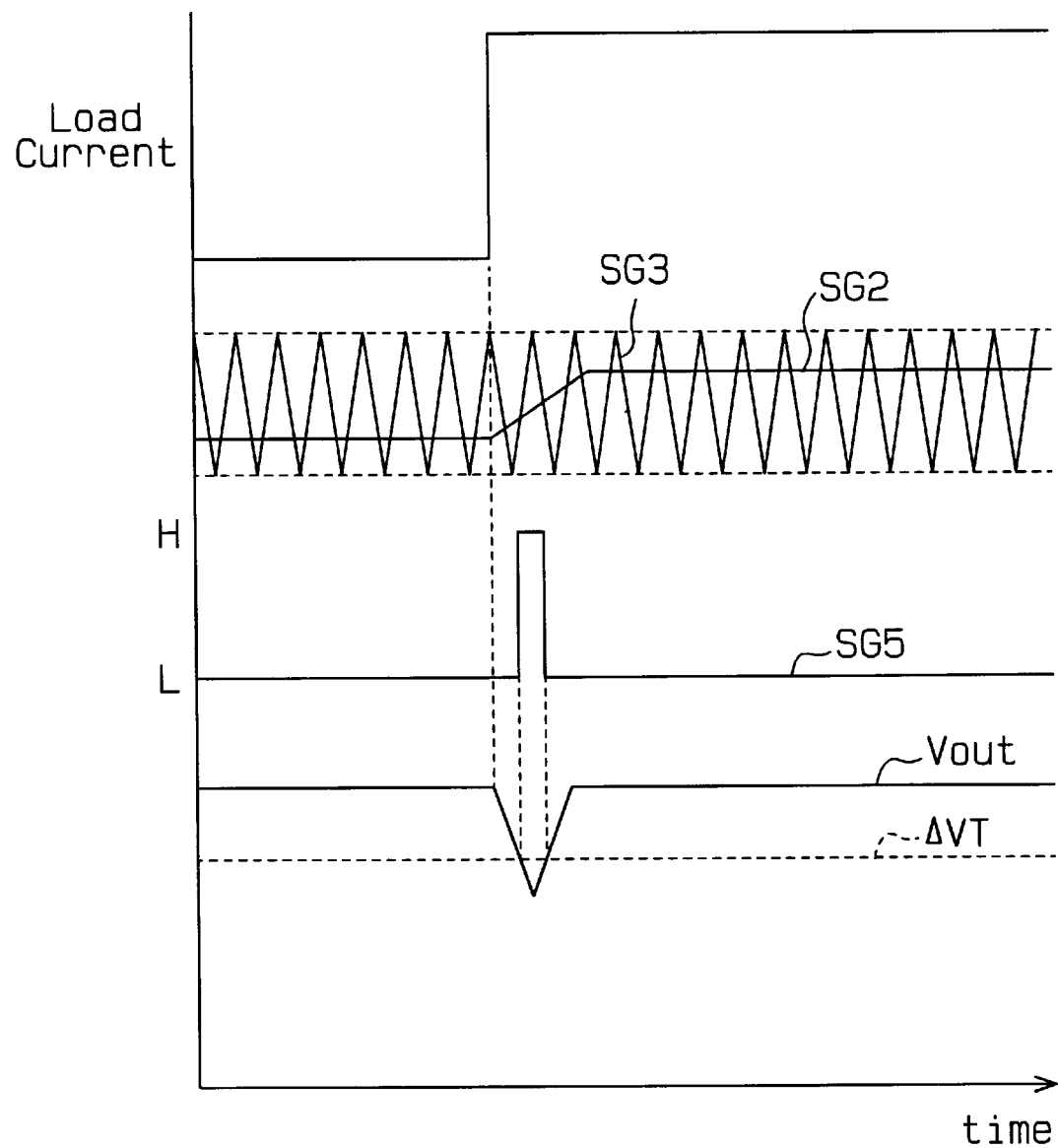
FIG. 5 is a waveform diagram describing the operation of the DC—DC converter of FIG. 3.

In the DC—DC converter 100 according to the first embodiment, as shown in FIG. 5, even if the load current suddenly changes, a sudden drop of the output voltage Vout is prevented by the comparator 21. Accordingly, the DC—DC converter 100 outputs a stable output voltage Vout. Moreover, the DC—DC converter 100 according to the first embodiment is obtained by the addition of only the comparator 21 and by the change from a 2-input comparator to the 3-input PWM comparator 22.

Second Embodiment

Figure 6:
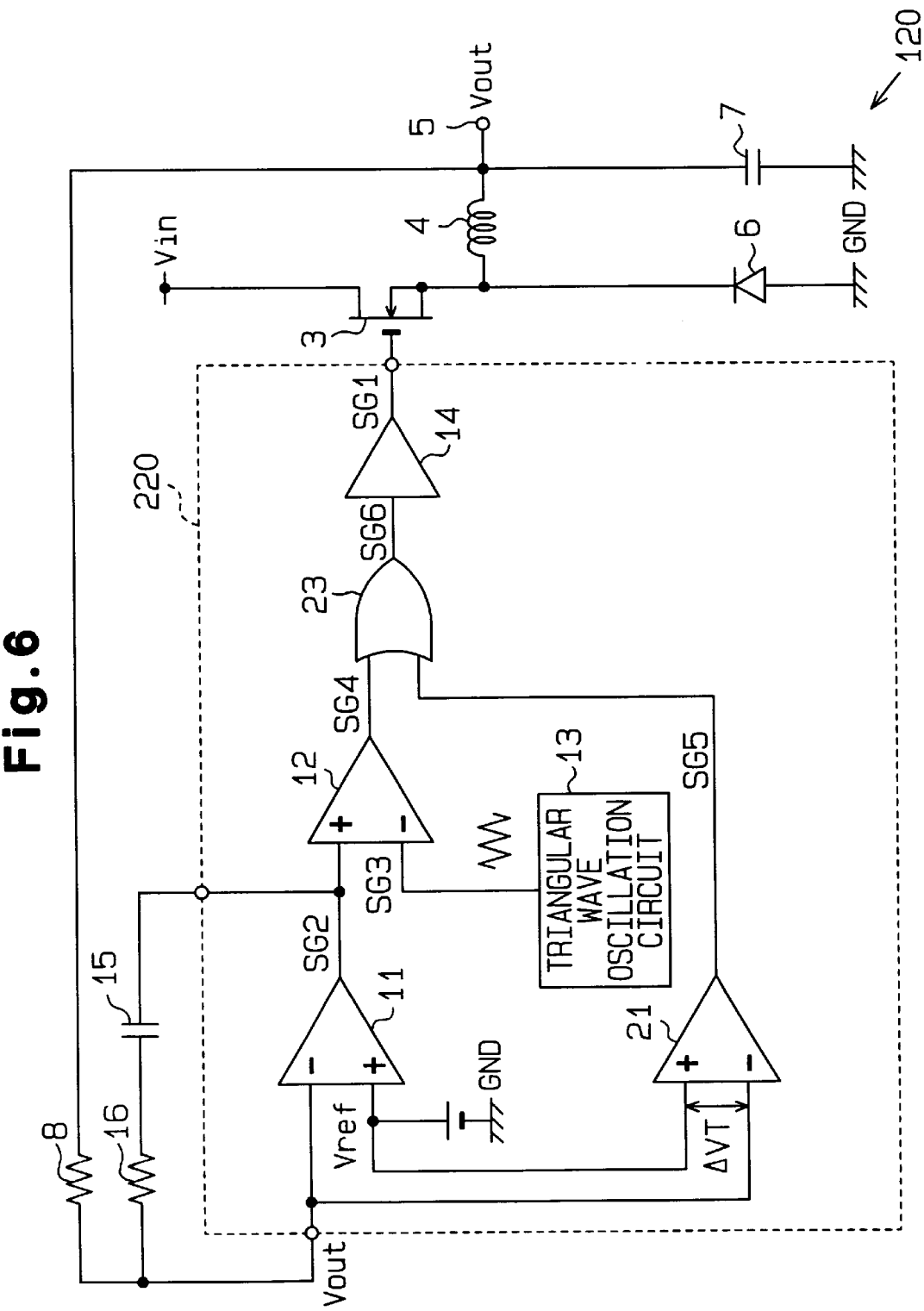
FIG. 6 is a schematic circuit diagram of a DC—DC converter according to a second embodiment of the present invention.

FIG. 6 is a circuit diagram of a DC—DC converter 120 according to a second embodiment of the present invention. A control circuit 220 of the DC—DC converter 120 includes the error amplification circuit 11, the PWM comparator 12, the triangular wave oscillation circuit 13, the output circuit 14, the comparator 21 with the offset voltage, and an OR circuit 23.

The OR circuit 23 compares the duty control signal SG4 from the PWM comparator 12 and the output signal SG5 from the comparator 21 and supplies the signal having a larger level between the duty control signal SG4 and the output signal SG5 to the output circuit 14 as an output signal SG6.

When a change in the load current is relatively small (i.e., when the voltage difference between the output voltage Vout and the reference voltage Vref is less than the offset voltage ΔVT), the comparator 21 supplies the output signal SG5 having the L level to the OR circuit 23. The PWM comparator 12 compares the error output signal SG2 and the triangular wave signal SG3 and supplies the duty control signal SG4 having a predetermined duty ratio to the OR circuit 23. Accordingly, the OR circuit 23 receives the duty control signal SG4 and the output signal SG5 having the L level and supplies the duty control signal SG6 to the output circuit 14. The output circuit 14 receives the duty control signal SG6 and supplies an output signal SG1 (the duty control output signal SG6) to the output transistor 3. The output transistor 3 is on/off-controlled in accordance with the duty control output signal SG1, and the output voltage Vout converges on the predetermined voltage (reference voltage Vref).

When the load current changes suddenly (i.e., when the output voltage Vout is less than the value of the reference voltage Vref minus the offset voltage ΔVT), the comparator 21 supplies the output signal SG5 having the H level to the OR circuit 23. During the period when the output signal SG5 has the H level, the OR circuit 23 supplies the output signal SG6 having the H level to the output circuit 14. Accordingly, the output circuit 14 supplies the output signal SG6 having the H level to the output transistor 3 and the output transistor 3 is maintained in the on state. Hereupon, the output voltage Vout rises quickly by the DC power supply voltage Vin, and a sudden drop of the output voltage Vout is prevented.

Third Embodiment

Figure 7:
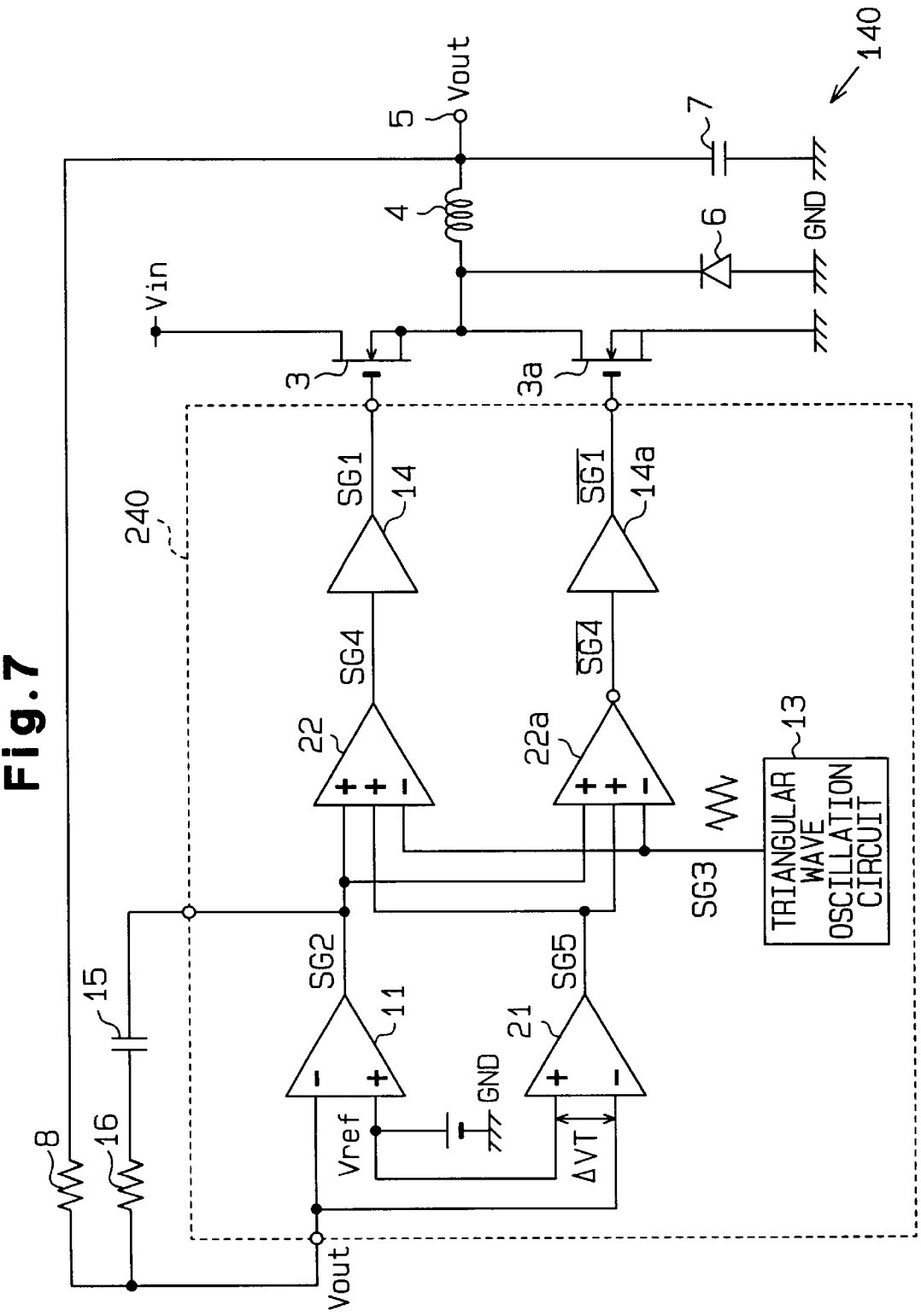
FIG. 7 is a schematic circuit diagram of a DC—DC converter according to a third embodiment of the present invention.

FIG. 7 is a schematic circuit diagram of a DC—DC converter 140 according to a third embodiment of the present invention. A control circuit 240 of the DC—DC converter 140 includes the error amplification circuit 11, the triangular wave oscillation circuit 13, the output circuit 14, a second output circuit 14a, the comparator 21 with the offset voltage, the PWM comparator 22, and a second PWM comparator 22a. Further, the DC—DC comparator 140 includes a second output transistor 3a.

The second PWM comparator 22a receives the error output signal SG2, the output signal SG5, and the triangular wave signal SG3 and supplies an inverse duty control signal /SG4, which is the inverse of the duty control signal SG4 of the PWM comparator 22, to the output circuit 14a. The second output circuit 14a receives the inverse duty control signal /SG4 from the second PWM comparator 22a and supplies an inverse output signal /SG1 to the gate of the second output transistor 3a. The second output transistor 3a is connected between the source of the first output transistor 3 and the ground GND.

In the third embodiment, the first and second output transistors 3 and 3a are complementarily on/off-controlled by the first and second PWM comparators 22 and 22a and the first and second output circuits 14 and 14a. This control prevents a sudden drop of the output voltage Vout. Further, when the first output transistor 3 turns off and the second output transistor 3a turns on, the source potential of the first output transistor 3 quickly changes to the ground GND level.

Fourth Embodiment

Figure 8:
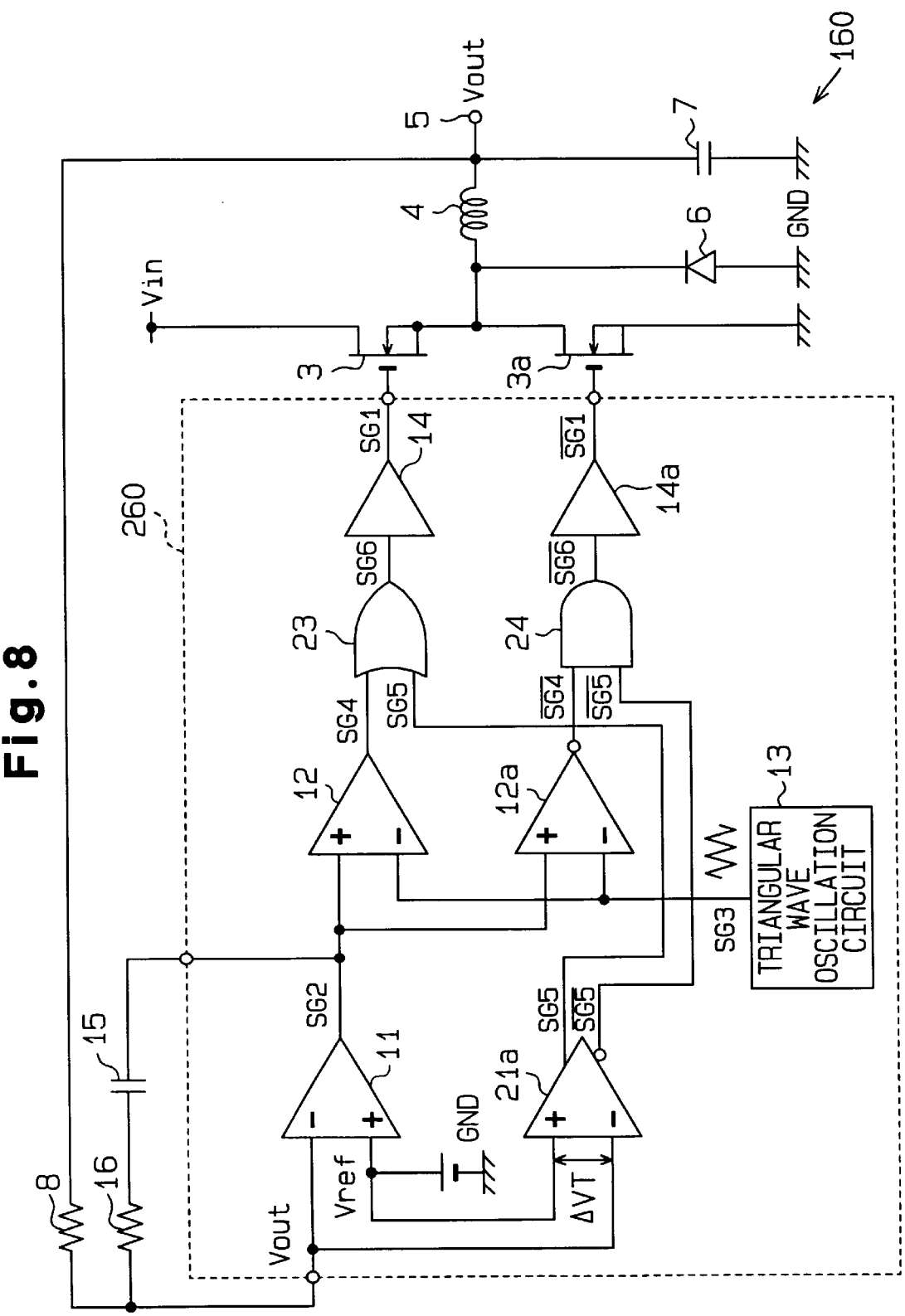
FIG. 8 is a schematic circuit diagram of a DC—DC converter according to a fourth embodiment of the present invention.

FIG. 8 is a schematic diagram of a DC—DC converter 160 according to a fourth embodiment of the present invention. A control circuit 260 of the DC—DC converter 160 includes the error amplification circuit 11, the PWM comparator 12, the second PWM comparator 12a, the triangular wave oscillation circuit 13, the output circuits 14 and 14a, the comparator 21a with the offset voltage, the OR circuit 23, and an AND circuit 24. Further, the DC—DC converter 260 includes the second output transistor 3a.

The comparator 21a supplies the output signal SG5 to the OR circuit 23 and supplies an inverse output signal /SG5 to the AND circuit 24. In other words, the comparator 21a outputs the output signal SG5 having the H level and the inverse output signal /SG5 when the output voltage Vout is equal to or lower than the reference voltage Vref minus the offset voltage ΔVT.

The OR circuit 23 compares the duty control signal SG4 from the PWM comparator 12 and the output signal SG5 from the comparator 21a and outputs the signal having the larger level between the duty control signal SG4 and the output signal SG5 to the output circuit 14 as the output signal 6.

The AND circuit 24 receives the inverse duty control signal /SG4 from the PWM comparator 12a and the inverse output signal /SG5 from the comparator 21a and supplies an inverse output signal /SG6, which is the inverse of the output signal SG6, to the second output circuit 14a.

In the fourth embodiment, the output transistors 3 and 3a are complementarily on/off-controlled by the PWM comparator 12 and 12a, the OR circuit 23, and the AND circuit 24. This control prevents a sudden drop of the output voltage Vout.

It should be apparent to those skilled in the art that the present invention may be embodied in many other specific forms without departing from the spirit or scope of the invention. Particularly, it should be understood that the invention may be embodied in the following forms.

The output transistors 3 and 3a may be P-channel MOS transistors. In this case, the output circuit 14 generates the inverse duty control output signal SG1 of the duty control signal SG4. Further, the output transistor 3 may be a bipolar transistor.

The output circuits 14 and 14a may be omitted if necessary.

Further, the triangular wave oscillation circuit 13 may be formed by a separate semiconductor integrated circuit device from the semiconductor integrated circuit device of the control circuit. In this case, the control circuit is formed by electrically connecting a plurality of semiconductor integrated circuit devices.

Further, the control circuits 200, 220, 240, and 260 may also be formed on a single chip semiconductor integrated circuit device on which the output transistor 3 and the output coil 4 and the smoothing capacitor 7 are formed. In this case, a DC—DC converter is formed using the single chip semiconductor integrated circuit device.

Therefore, the present example and embodiments are to be considered as illustrative and not restrictive and the invention is not to be limited to the details given herein, but may be modified within the scope and equivalence of the appended claims.

What is claimed is:

1. A method for controlling the output voltage of a DC—DC converter, comprising the steps of:
    generating an error output signal indicating the voltage difference between the output voltage the DC—DC converter and a reference voltage;
    generating a comparison signal by comparing the voltage difference and a predetermined offset voltage, wherein the comparison signal having a predetermined level is generated when the voltage difference is equal to or greater than the predetermined offset voltage;
    generating a triangular wave signal;
    generating a duty control signal having a predetermined duty ratio by comparing the triangular wave signal and one of the error output signal and the comparison signal, wherein the duty control signal having the maximum duty ratio and the comparison signal having a predetermined level are generated substantially simultaneously; and
    generating the output voltage by causing an output transistor to turn on or off in response to the duty control signal, wherein the output transistor is turned on while the duty control signal having the maximum duty ratio is being supplied to the output transistor.

2. A method for controlling the output voltage of a DC—DC converter, comprising the steps of:
    generating an error output signal indicating the voltage difference between the output voltage of the DC—DC converter and a reference voltage;
    generating a triangular wave signal;
    generating a duty control signal having a predetermined duty ratio by comparing the error output signal and the triangular wave signal;
    generating a comparison signal by comparing the voltage difference between the output voltage and the reference voltage and a predetermined offset voltage, wherein the comparison signal having a predetermined level is generated when the voltage difference is equal to or greater than the predetermined offset voltage; and
    generating the output voltage by causing an output transistor to turn on or off in response to the duty control signal, wherein the comparison signal is supplied to the output transistor instead of the duty control signal to cause the output transistor to be turned on.

3. A control circuit for controlling the output voltage of a DC—DC converter by controlling a first output transistor of the DC—DC converter, comprising:

an error amplification circuit for comparing the output voltage of the DC—DC converter and a reference voltage and generating an error output signal indicating the voltage difference between the output voltage of the DC—DC converter and the reference voltage;

an offset comparator for comparing a predetermined offset voltage and the error output signal and generating a comparison signal, wherein the comparison signal has a predetermined level when the error output signal is equal to or greater than the predetermined offset voltage;

a triangular wave oscillation circuit for generating a triangular wave signal; and a first PWM comparator, connected to the error amplification circuit, the offset comparator, and the triangular oscillation circuit, for comparing the triangular wave signal and one of the error output signal and the comparison signal, generating a first duty control signal having a predetermined duty ratio and supplying the first duty control signal to the first output transistor, wherein the first duty control signal has a maximum duty ratio which turns on the first output transistor when the comparison signal having the predetermined level is supplied from the offset comparator to the first PWM comparator.

4. The control circuit of claim 3, wherein the offset comparator includes a first transistor having a gate for receiving the output voltage and a second transistor having a gate for receiving the reference voltage, and wherein the first and second transistors have different sizes.

5. The control circuit of claim 3, wherein the offset comparator includes a resistance dividing circuit for dividing the reference voltage and generating a voltage in which the predetermined offset voltage is subtracted from the reference voltage, and wherein the offset comparator compares the output voltage and the voltage generated by the resistance dividing circuit.

6. The control circuit of claim 3, wherein the DC—DC converter further includes a second transistor connected in series with the first output transistor, and wherein the control circuit, further comprises:

a second PWM comparator, connected to the error amplification circuit, the offset comparator, and the triangular wave oscillation circuit, for comparing the triangular wave signal and one of the error output signal and the comparison signal, generating a second duty control signal, which is an inverse of the first duty signal, and supplying the second duty control signal to the second output transistor.

7. A control circuit for controlling the output voltage of a DC—DC converter by controlling a first output transistor of the DC—DC converter, comprising:

an error amplification circuit for comparing the output voltage of the DC—DC converter and a reference voltage and generating the error output signal indicating the voltage difference between the output voltage of the DC—DC converter and the reference voltage;

an offset comparator for comparing a predetermined offset voltage and the error output signal and generating a comparison signal, wherein the comparison signal has a predetermined level when the error signal is equal to or greater than the predetermined offset voltage; and a triangular wave oscillation circuit for generating a triangular wave signal;

a first PWM comparator, connected to the error amplification circuit and the triangular oscillation circuit, for comparing the error output signal and the triangular wave signal and supplying a first duty control signal having a predetermined duty ratio; and a selection circuit, connected to the offset comparator and the first PWM comparator, for selecting one of the comparison signal and the first duty control signal and supplying the selected signal to the first output transistor, wherein the selection circuit supplies the comparison signal to the first output transistor to turn on the first output transistor when the comparison signal having the predetermined level is generated.

8. The control circuit of claim 7, wherein the offset comparator includes a first transistor having a gate for receiving the output voltage and a second transistor having a gate for receiving the reference voltage, and wherein the first and second transistors have different sizes.

9. The control circuit of claim 7, wherein the offset comparator includes a resistance dividing circuit for dividing the reference voltage and generating a voltage in which the predetermined offset voltage is subtracted from the reference voltage, and wherein the offset comparator compares the output voltage and the voltage generated by the resistance dividing circuit.

10. The control circuit of claim 7, wherein the selection circuit is an OR circuit.

11. The control circuit of claim 7, wherein the DC—DC converter further includes a second transistor connected in series with the first output transistor, and the control circuit further comprises:

a second PWM comparator, connected to the error amplification circuit and the triangular wave oscillation circuit, for comparing the error output signal and the triangular wave signal and generating a second duty control signal, which is an inverse of the first duty signal; and a logic circuit, connected to the offset comparator and the second PWM comparator, receiving the comparison signal and the second duty control signal and supplying an inverse selection signal, which is the inverse of the selection signal, to the second output transistor.

12. The control circuit of claim 11, wherein the logic circuit is an AND circuit.

13. A DC—DC converter for generating an output voltage, comprising:

a smoothing circuit;

a first output transistor, connected to the smoothing circuit, for generating the output voltage;

an error amplification circuit for comparing the output voltage and a reference voltage and generating an error output signal indicating the voltage difference between the output voltage and the reference voltage;

an offset comparator for comparing a predetermined offset voltage and the error output signal and generating a comparison signal, wherein the comparison signal has a predetermined level when the error output signal is equal to or greater than the predetermined offset voltage;

a triangular wave oscillation circuit for generating a triangular wave signal; and a first PWM comparator, connected to the error amplification circuit, the offset comparator, and the triangular oscillation circuit, for comparing the triangular wave signal and one of the error output signal and the comparison signal, generating a first duty control signal having a predetermined duty ratio and supplying the first duty control signal to the first output transistor, wherein the first duty control signal has a maximum duty ratio which turns on the first output transistor when the comparison signal having the predetermined level is supplied from the offset comparator to the first PWM comparator.

14. The DC—DC converter of claim 13, wherein the offset comparator includes a first transistor having a gate for receiving the output voltage and a second transistor having a gate for receiving the reference voltage, and wherein the first and second transistors have different sizes for setting the predetermined offset voltage.

15. The DC—DC converter of claim 13, wherein the offset comparator includes a resistance dividing circuit for dividing the reference voltage and generating a voltage in which the predetermined offset voltage is subtracted from the reference voltage, and wherein the offset comparator compares the output voltage and the voltage generated by the resistance dividing circuit.

16. The DC—DC converter of claim 13, further comprising:
a second output transistor connected in series with the first output transistor; and
a second PWM comparator, connected to the error amplification circuit, the offset comparator, and the triangular wave oscillation circuit, for comparing the triangular wave signal and one of the error output signal and the comparison signal and supplying a second duty control signal, which is an inverse of the first duty signal, to the second output transistor.

17. A DC—DC converter for generating an output voltage, comprising:
a smoothing circuit;
a first output transistor, connected to the smoothing circuits, for generating the output voltage;
an error amplification circuit for comparing the output voltage and a reference voltage and generating an error output signal indicating the voltage difference between the output voltage of the DC—DC converter and the reference voltage;
an offset comparator for comparing a predetermined offset voltage and the error output signal and generating a comparison signal, wherein the comparison signal has a predetermined level when the error signal is equal to or greater than the predetermined offset voltage; and
a triangular wave oscillation circuit for generating a triangular wave signal;
a first PWM comparator, connected to the error amplification circuit and the triangular oscillation circuit, for comparing the error output signal and the triangular wave signal and supplying a first duty control signal having a predetermined duty ratio; and
a selection circuit, connected to the offset comparator and the first PWM comparator, for selecting one of the comparison signal and the first duty control signal and supplying the selected signal to the first output transistor, wherein the selection circuit supplies the comparison signal to the first output transistor to turn on the first output transistor during the time when the comparison signal having the predetermined level is generated.

18. The DC—DC converter of claim 17, wherein the offset comparator includes a first transistor having a gate for receiving the output voltage and a second transistor having a gate for receiving the reference voltage, and wherein the first and second transistors have different sizes for setting the predetermined offset voltage.

19. The DC—DC converter of claim 17, wherein the offset comparator includes a resistance dividing circuit for dividing the reference voltage and generating a voltage in which the predetermined offset voltage is subtracted from the reference voltage, and wherein the offset comparator compares the output voltage and the voltage generated by the resistance dividing circuit.

20. The DC—DC converter of claim 17, wherein the selection circuit is an OR circuit.

21. The DC—DC converter of claim 17, further comprising:
a second output transistor connected in series with the first output transistor;
a second PWM comparator, connected to the error amplification circuit and the triangular wave oscillation circuit, for comparing the error output signal and the triangular wave signal and generating a second duty control signal, which is an inverse of the first duty signal; and
a logic circuit, connected to the offset comparator and the second PWM comparator, for receiving the comparison signal and the second duty control signal and supplying an inverse selection signal, which is an inverse of the selected signal, to the second output transistor.

22. The DC—DC converter of claim 21, wherein the logic circuit is an AND circuit.

23. A control circuit for controlling the output voltage of a DC—DC converter, comprising:
an error amplification circuit having an inverting input terminal that receives the output voltage of the DC—DC converter and a noninverting input terminal that receives a reference voltage, the error amplification circuit comparing the output voltage and the reference voltage and generating an error amplification signal;
an offset comparator having an inverting input terminal that receives the output voltage of the DC—DC converter and a noninverting input terminal that receives the reference voltage, the offset comparator comparing the output voltage and the reference voltage and generating a comparison signal, wherein when the output voltage is less than the reference voltage by more than a predetermined offset voltage value, the comparison signal has a high value;
a triangular wave oscillation circuit for generating a triangle wave signal; and
a first PWM comparator having a first noninverting input terminal connected to the error amplification circuit and receiving the error output signal, a second noninverting input terminal connected to the offset comparator and receiving the comparison signal, an inverting input terminal connected to the triangular wave oscillation circuit and receiving the triangle wave signal, and an output terminal connected to an output transistor of the DC—DC converter, the first PWM comparator comparing the triangle wave signal to the larger one of the error output signal and the comparison signal, and generating a first duty control signal therefrom, wherein the first duty control signal has a maximum duty ratio which turns on the output transistor when the comparison signal has the high value.

24. The control circuit of claim 23, wherein the high value of the comparison signal is set to be equal to or greater than a maximum level of the triangular wave signal.

25. The control circuit of claim 24, wherein a low value of the comparison signal is set to be equal to or less than a minimum level of the triangular wave signal.

26. The control circuit of claim 23, wherein the offset comparator comprises:

an input circuit including a first transistor and a second transistor, wherein the collectors of the first and second transistors are connected together and to a high potential power supply by way of a first current source, the base of the first transistor is the noninverting input terminal that receives the reference voltage and the base of the second transistor is the inverting input terminal that receives the output voltage of the DC—DC converter, the emitter of the first transistor is connected to ground by way of a third transistor, and the emitter of the second transistor is connected to ground by way of a fourth transistor;

an output circuit including a fifth transistor and a sixth transistor, wherein the collector of the fifth transistor is connected to the high potential power supply by way of a second current source, the emitter of the fifth transistor is connected to ground, and the base of the fifth transistor is connected to a first node between the collectors of the second and fourth transistors, and the collector of the sixth transistor is connected to the high potential power supply by way of a third current source, the emitter of the sixth transistor is connected to ground, and the base of the sixth transistor is connected to a second node between the collector of the fifth transistor and the second current source; and an output terminal at a third node between the collector of the sixth transistor and the third current source.

27. The control circuit of claim 26, wherein the predetermined offset voltage value is set by varying the size of the first and second transistors.

28. The control circuit of claim 26, further comprising a voltage divider circuit connected to the noninverting input terminal of the offset comparator.

29. The control circuit of claim 28, wherein the voltage divider circuit includes a first resistor and a second resistor connected in series between the reference voltage and ground, and wherein the noninverting input terminal is connected to a fourth node located between the first and second resistors.

* * * * *